United States Patent
Iwamoto et al.

(10) Patent No.: US 12,214,810 B2
(45) Date of Patent: Feb. 4, 2025

(54) AUTONOMOUS DRIVING SYSTEM, AUTONOMOUS DRIVING CONTROL METHOD, AND NONTRANSITORY STORAGE MEDIUM

(71) Applicant: TOYOTA JIDOSHA KABUSHIKI KAISHA, Toyota (JP)

(72) Inventors: Takayuki Iwamoto, Shizuoka-ken (JP); Kunihito Satou, Mishima (JP); Takefumi Goto, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 17/734,513

(22) Filed: May 2, 2022

(65) Prior Publication Data

US 2022/0363291 A1 Nov. 17, 2022

(30) Foreign Application Priority Data

May 11, 2021 (JP) ................................ 2021-080494

(51) Int. Cl.
*B60W 60/00* (2020.01)

(52) U.S. Cl.
CPC ....... *B60W 60/005* (2020.02); *B60W 2556/45* (2020.02)

(58) Field of Classification Search
None
See application file for complete search history.

(56) References Cited

U.S. PATENT DOCUMENTS 12,105,532 B2 * 10/2024 Andree ............. B60W 60/0025
2020/0057436 A1    2/2020 Boda et al.
2020/0239023 A1 *  7/2020 Srinivasan ........... G05D 1/0027
2020/0307633 A1 * 10/2020 Naruse ................ B60W 50/035
2024/0103540 A1 *  3/2024 Kameoka .............. G05D 1/226

FOREIGN PATENT DOCUMENTS

| JP | 2018-077649 A | 5/2018 |
| KR | 10-2021-0006926 A | 1/2021 |
| WO | 2020/092635 A1 | 5/2020 |

OTHER PUBLICATIONS

Takayuki Iwamoto et al., U.S. Appl. No. 17/719,958, entitled Autonomous Driving System, Autonomous Driving Control Method, and Non-Transitory Storage Medium, filed Apr. 13, 2022.

* cited by examiner

*Primary Examiner* — James J Lee
*Assistant Examiner* — David Hatch
(74) *Attorney, Agent, or Firm* — Dinsmore & Shohl LLP

(57) ABSTRACT

An autonomous driving system includes one or more storage devices configured to store specific position information indicating specific positions at which there is a possibility that remote assistance is required; and one or more processors configured to: determine presence or absence of an abnormality in a remote assistance system configured to provide the remote assistance to an autonomous driving vehicle; set, when an abnormality is detected in the remote assistance system, any one of the specific positions on a target route from a current position of the autonomous driving vehicle to a destination as a limit position based on the specific position information; set a target retracting position such that the target retracting position is included in the target route from the current position to the limit position; and control the autonomous driving vehicle such that the autonomous driving vehicle stops at the target retracting position.

3 Claims, 15 Drawing Sheets

AUTONOMOUS DRIVING SYSTEM, AUTONOMOUS DRIVING CONTROL METHOD, AND NONTRANSITORY STORAGE MEDIUM

CROSS-REFERENCE TO RELATED APPLICATION

This application claims priority to Japanese Patent Application No. 2021-080494 filed on May 11, 2021, incorporated herein by reference in its entirety.

BACKGROUND

1. Technical Field

The present disclosure relates to an autonomous driving vehicle, an autonomous driving control, and a non-transitory storage medium.

2. Description of Related Art

Japanese Unexamined Patent Application Publication No. 2018-077649 discloses a remote driving control device that executes remote driving of a vehicle. The remote driving control device executes the remote driving of the vehicle by communicating with the vehicle.

SUMMARY

A remote assistance technology for executing remote assistance to traveling of an autonomous driving vehicle is conceivable. The remote assistance requires communication between a remote assistance device and an autonomous driving vehicle. A remote assistance system includes a configuration or a function used for providing the remote assistance to the autonomous driving vehicle. For example, the remote assistance system includes the remote assistance device, a communication network, a communication device mounted on the autonomous driving vehicle, and the like. When an abnormality occurs in at least a part of the remote assistance system, the remote assistance cannot be provided to the autonomous driving vehicle, or accuracy of the remote assistance is reduced.

The present disclosure provides a technology in which an autonomous driving vehicle can be appropriately controlled when an abnormality occurs in a remote assistance system that provides remote assistance to the autonomous driving vehicle.

A first aspect of the present disclosure relates to an autonomous driving system configured to control an autonomous driving vehicle that is a target of remote assistance. The autonomous driving system includes one or more storage devices configured to store specific position information indicating specific positions at which there is a possibility that the remote assistance is required, and one or more processors. The one or more processors are configured to determine presence or absence of an abnormality in a remote assistance system configured to provide the remote assistance to the autonomous driving vehicle, set, when an abnormality is detected in the remote assistance system, any one of the specific positions on a target route from a current position of the autonomous driving vehicle to a destination as a limit position based on the specific position information, set a target retracting position such that the target retracting position is included in the target route from the current position to the limit position, and control the autonomous driving vehicle such that the autonomous driving vehicle stops at the target retracting position.

In the first aspect, the one or more processors may be further configured to acquire a first specific position closest to the current position on the target route based on the specific position information, and set the first specific position as the limit position.

In the first aspect, the one or more processors may be further configured to acquire a first specific position closest to the current position on the target route based on the specific position information, determine whether the first specific position satisfies a permitted condition, acquire, when the first specific position does not satisfy the permitted condition, a second specific position different from the first specific position on the target route based on the specific position information, and set the second specific position as the limit position. The permitted condition may include at least one of (i) a distance between the current position and the first specific position is equal to or greater than a distance threshold value, and (ii) a vehicle control amount that is required to stop the autonomous driving vehicle at a position before the first specific position is equal to or lower than a control amount threshold value.

In the first aspect, the one or more processors may be further configured to acquire a first specific position closest to the current position on the target route based on the specific position information, and set, when the abnormality in the remote assistance system is a functional failure, the first specific position as the limit position.

In the first aspect, the one or more processors may be further configured to acquire a first specific position closest to the current position on the target route based on the specific position information, determine, when the abnormality in the remote assistance system is performance degradation, whether the first specific position satisfies a permitted condition, acquire, when the first specific position does not satisfy the permitted condition, a second specific position different from the first specific position on the target route based on the specific position information, and set the second specific position as the limit position. The permitted condition may include at least one of (i) a distance between the current position and the first specific position is equal to or greater than a distance threshold value, and (ii) a vehicle control amount that is required to stop the autonomous driving vehicle at a position before the first specific position is equal to or lower than a control amount threshold value.

A second aspect of the present disclosure relates to an autonomous driving control method, executed by one or more processors and controlling an autonomous driving vehicle that is a target of remote assistance. The autonomous driving control method includes determining presence or absence of an abnormality in a remote assistance system configured to provide the remote assistance to the autonomous driving vehicle, setting, when an abnormality is detected in the remote assistance system, any one of specific positions on a target route from a current position of the autonomous driving vehicle to a destination as a limit position based on specific position information, setting a target retracting position such that the target retracting position is included in the target route from the current position to the limit position, and controlling the autonomous driving vehicle such that the autonomous driving vehicle stops at the target retracting position. The specific position information indicates the specific positions at which there is a possibility that the remote assistance is required the remote assistance.

A third aspect of the present disclosure relates to a non-transitory storage medium storing instructions that are executable by a computer and that causes the computer to perform functions for controlling an autonomous driving vehicle that is a target of remote assistance. The functions include determining presence or absence of an abnormality in a remote assistance system configured to provide the remote assistance to the autonomous driving vehicle, setting, when an abnormality is detected in the remote assistance system, any one of specific positions on a target route from a current position of the autonomous driving vehicle to a destination as a limit position based on specific position information, setting a target retracting position such that the target retracting position is included in the target route from the current position to the limit position, and controlling the autonomous driving vehicle such that the autonomous driving vehicle stops at the target retracting position. The specific position information indicates the specific positions at which there is a possibility that the remote assistance is required the remote assistance.

With each aspect of the present disclosure, when an abnormality is detected in a remote assistance system, a target retracting position is set in consideration of specific positions at which remote assistance can be required. Specifically, any one of the specific positions on a target route to a destination is set as a limit position. Then, the target retracting position is set such that the target retracting position is included in the target route from a current position to the limit position of an autonomous driving vehicle.

The target retracting position does not have to be around the current position of the autonomous driving vehicle, and may be any position as long as it is before the limit position. Therefore, it is possible to set the target retracting position such that the autonomous driving vehicle can stop with a margin. With each aspect of the present disclosure, safety of the autonomous driving vehicle and a vehicle in its vicinity can be improved.

Further, it is not required that the autonomous driving is ended around the current position, and the autonomous driving can be continued until the vehicle reaches the target retracting position. With each aspect of the present disclosure, continuity of the autonomous driving can be improved.

Further, since any one of specific positions on the target route is set as the limit position, the number of specific positions which the autonomous driving vehicle passes through is reduced as compared with that of a case where the autonomous driving vehicle has to travel to a destination. Since the number of specific positions which the autonomous driving vehicle passes through is reduced, a probability that the remote assistance is required is reduced as a whole. Therefore, an influence of the abnormality in the remote assistance system is at least reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to accompanying drawings.

1. Overview of Remote Assistance

Figure 1:
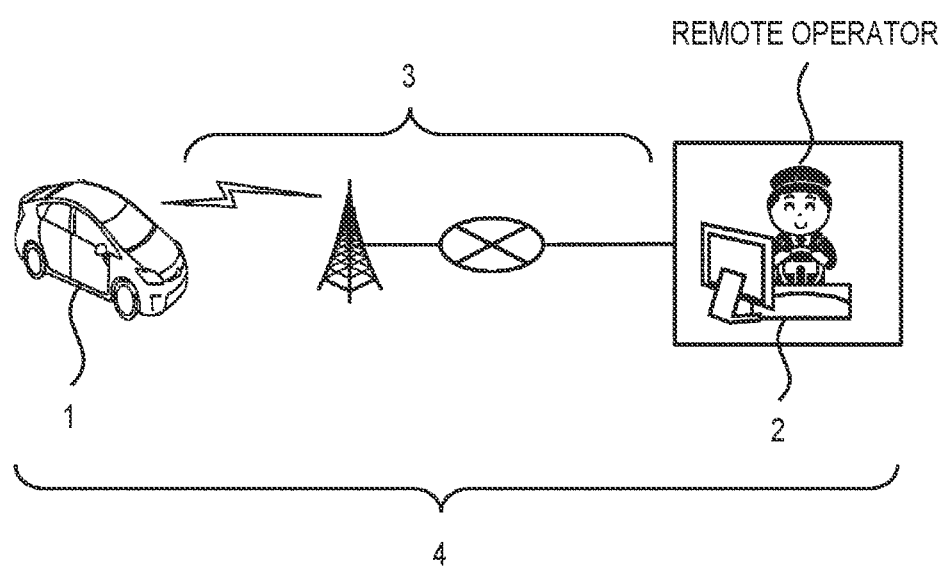
FIG. 1 is a conceptual diagram illustrating a remote assistance system according to an embodiment of the present disclosure.

FIG. 1 is a conceptual diagram illustrating a remote assistance system according to the present embodiment. The remote assistance system includes an autonomous driving vehicle 1, a remote assistance device 2, and a communication network 3.

The autonomous driving vehicle 1 is capable of autonomous driving. Here, as the autonomous driving, it is assumed that a driver does not necessarily have to fully concentrate on driving (a so-called autonomous driving of Level 3 or higher). The autonomous driving vehicle 1 may be an autonomous driving vehicle of Level 4 or higher in which a driver is not required. The autonomous driving vehicle 1 is a target of remote assistance in the present embodiment.

The remote assistance device 2 is a device used for executing remote assistance to the autonomous driving vehicle 1, and is operated by a remote operator. The autonomous driving vehicle 1 is connected to the remote assistance device 2 such that the autonomous driving vehicle 1 and the remote assistance device 2 are capable of communicating with each other via the communication network 3. The remote assistance device 2 communicates with the autonomous driving vehicle 1 via the communication network 3 to execute the remote assistance to traveling of the autonomous driving vehicle 1. In more detail, the remote operator operates the remote assistance device 2 to execute the remote assistance to the traveling of the autonomous driving vehicle 1. It can be said that the remote assistance device 2 is a device that supports the remote assistance for the autonomous driving vehicle 1 by the remote operator.

The communication network 3 includes a wireless base station, a wireless communication network, a wired communication network, and the like. As the wireless communication network, a 5G network is exemplified.

Figure 2:
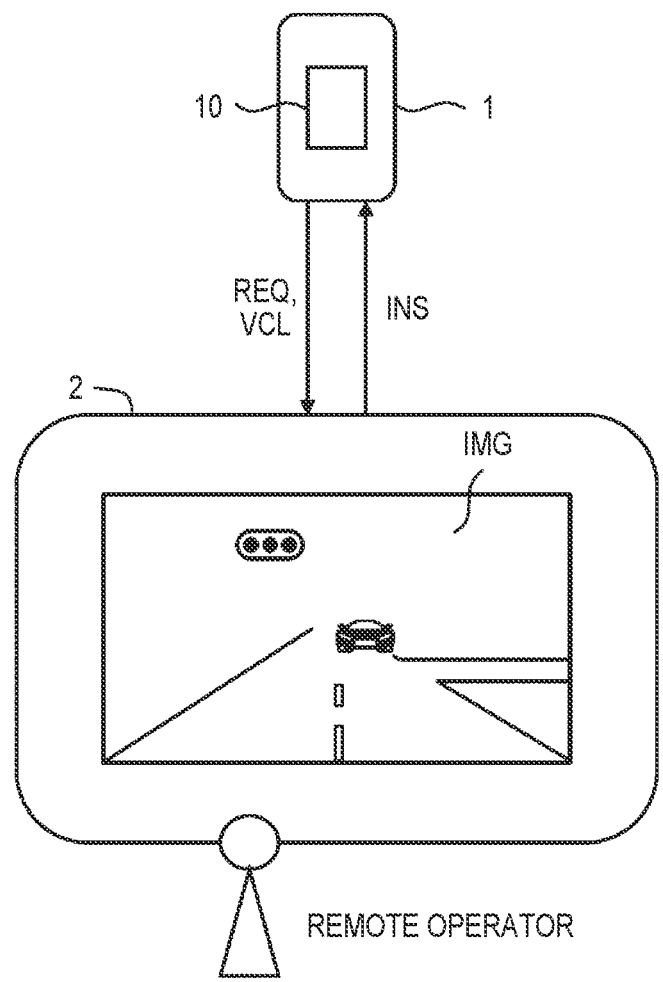
FIG. 2 is a conceptual diagram used for describing an overview of remote assistance according to the embodiment of the present disclosure.

FIG. 2 is a conceptual diagram used for describing an overview of the remote assistance according to the present embodiment. The autonomous driving system 10 controls the autonomous driving vehicle 1. During the autonomous driving, the autonomous driving system 10 executes various vehicle processes. Typical vehicle processes during the autonomous driving include the followings.

(1) Recognition processing: the autonomous driving system 10 recognizes the situation on the surroundings of the autonomous driving vehicle 1 using a recognition sensor. For example, the autonomous driving system 10 recognizes a signal display of a signal device (for example, a green signal, a yellow signal, a red signal, and a right turn signal) using a camera.

(2) Action determination processing: the autonomous driving system 10 determines whether to execute an action based on a result of the recognition processing. Examples of the action include starting, stopping, turning right, turning left, and changing lanes.

(3) Timing determination processing: the autonomous driving system 10 determines an execution timing for executing the above actions.

Figure 3:
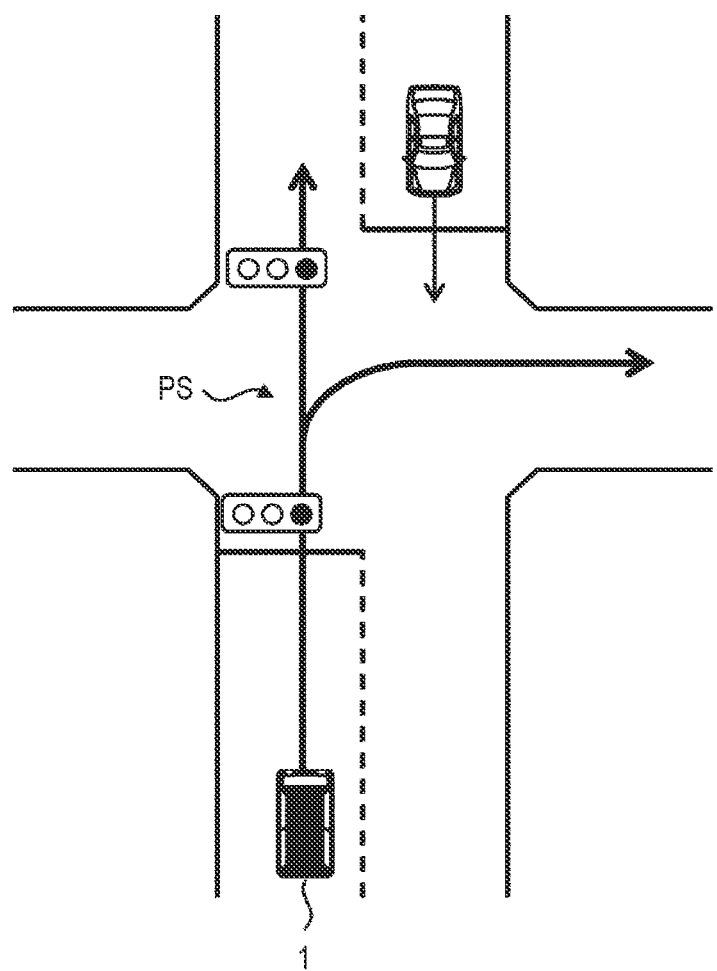
FIG. 3 is a conceptual diagram used for describing an example of specific positions according to the embodiment of the present disclosure.

Typically, a situation in which the remote assistance by the remote operator is required is a situation where the autonomous driving is difficult. For example, the remote assistance can be required at an intersection, as illustrated in FIG. 3.

For example, when a signal device installed at the intersection is exposed to the sunlight, the recognition accuracy of the signal display can be reduced. When the signal display cannot be accurately distinguished by the recognition processing, the autonomous driving system 10 requires the remote assistance for signal recognition. Further, when the signal display cannot be distinguished, it is also difficult to determine what action should be executed at what timing. Therefore, the autonomous driving system 10 requires the remote assistance also for the action determination processing and the timing determination processing.

Even when the signal display is distinguished, a situation where it may be difficult to determine whether the action may actually be executed is also conceivable. For example, even after the signal display viewed from the autonomous driving system 10 is "right turn possible", an oncoming vehicle may enter an intersection, or an oncoming vehicle or a preceding vehicle may remain in the intersection. In such a case, the autonomous driving system 10 may request the remote assistance for the action determination processing or the timing determination processing while the vehicle stops.

As yet another example, when a construction section exists in front of the autonomous driving vehicle 1, a situation where it may be difficult to determine whether to change lanes is also conceivable. In such a case, the autonomous driving system 10 may request the remote assistance for the action determination processing.

The autonomous driving system 10 may request the remote operator to remotely drive (remotely operate) the autonomous driving vehicle 1. In the present embodiment, the "remote assistance" is a concept that includes not only assistance for at least one of the recognition processing, the action determination processing, and the timing determination processing, but also the remote driving (the remote operation).

Upon determining that the remote assistance is required, the autonomous driving system 10 transmits a remote assistance request REQ to the remote assistance device 2 via the communication network 3. The remote assistance request REQ is information for requesting the remote assistance for the autonomous driving vehicle 1 from the remote operator. The remote assistance device 2 notifies the remote operator of the received remote assistance request REQ. In response to the remote assistance request REQ, the remote operator starts the remote assistance for the autonomous driving vehicle 1.

During the remote assistance, the autonomous driving system 10 transmits vehicle information VCL to the remote assistance device 2 via the communication network 3. The vehicle information VCL indicates a state of the autonomous driving vehicle 1, the situation on the surroundings thereof, a result of the vehicle processing by the autonomous driving system 10, and the like. The remote assistance device 2 presents the remote operator with the vehicle information VCL received from the autonomous driving system 10. For example, as illustrated in FIG. 2, the remote assistance device 2 displays image information IMG captured by a camera mounted on the autonomous driving vehicle 1 on the display device.

The remote operator executes the remote assistance for the autonomous driving vehicle 1 with reference to the vehicle information VCL. An operator instruction INS is an instruction to the autonomous driving vehicle 1 input by the remote operator. The remote assistance device 2 receives an input of the operator instruction INS from the remote operator. Then, the remote assistance device 2 transmits the operator instruction INS to the autonomous driving vehicle 1 via the communication network 3. The autonomous driving system 10 receives the operator instruction INS from the remote assistance device 2 and controls the autonomous driving vehicle 1 according to the received operator instruction INS.

2. Processing at Time of Occurrence of Abnormality in Remote Assistance System 2-1. Abnormality in Remote Assistance System In the present embodiment, a "remote assistance system 4" means a configuration or a function used for providing the remote assistance to the autonomous driving vehicle 1. For example, the remote assistance system 4 includes the remote assistance device 2, the communication network 3, a communication device mounted on the autonomous driving vehicle 1, and the like (see FIG. 1). Examples of the communication device mounted on the autonomous driving vehicle 1 include a communication electronic control unit (ECU), a communication module, and a transmission/reception circuit.

Hereinafter, a case where an "abnormality" occurs in at least a part of the remote assistance system 4 that provides the remote assistance to the autonomous driving vehicle 1 is conceivable.

For example, abnormalities in the remote assistance system 4 include a "functional failure" in which a function of the remote assistance system 4 is lost. An example of the functional failure of the remote assistance system 4 is a communication disruption. For example, when trouble occurs in the communication network 3, a communication disruption may occur. Another example of the functional failure in the remote assistance system 4 is a defect (down) of the remote assistance device 2. Yet another example of the functional failure in the remote assistance system 4 is a defect of the communication device mounted on the autonomous driving vehicle 1. When the functional failure occurs in the remote assistance system 4, it is impossible to provide the remote assistance to the autonomous driving vehicle 1.

Abnormalities in the remote assistance system 4 may include "performance degradation" in which the function of the remote assistance system 4 is degraded. An example of performance degradation of the remote assistance system 4 is significant degradation in communication speed or a throughput. Another example of performance degradation of the remote assistance system 4 is a significant increase in a communication delay. Yet another example of performance degradation of the remote assistance system 4 is degradation in internal communication speed or calculation speed in the communication ECU mounted on the autonomous driving vehicle 1. When performance degradation occurs in the remote assistance system 4, the accuracy of the remote assistance may be degraded.

2-2. Retracting Processing

When an abnormality occurs in the remote assistance system 4, the remote assistance cannot be provided to the autonomous driving vehicle 1, or the accuracy of the remote assistance is reduced. Then, when an abnormality is detected in the remote assistance system 4, the autonomous driving system 10 executes "retracting processing" for safely retracting the autonomous driving vehicle 1.

Figure 4:
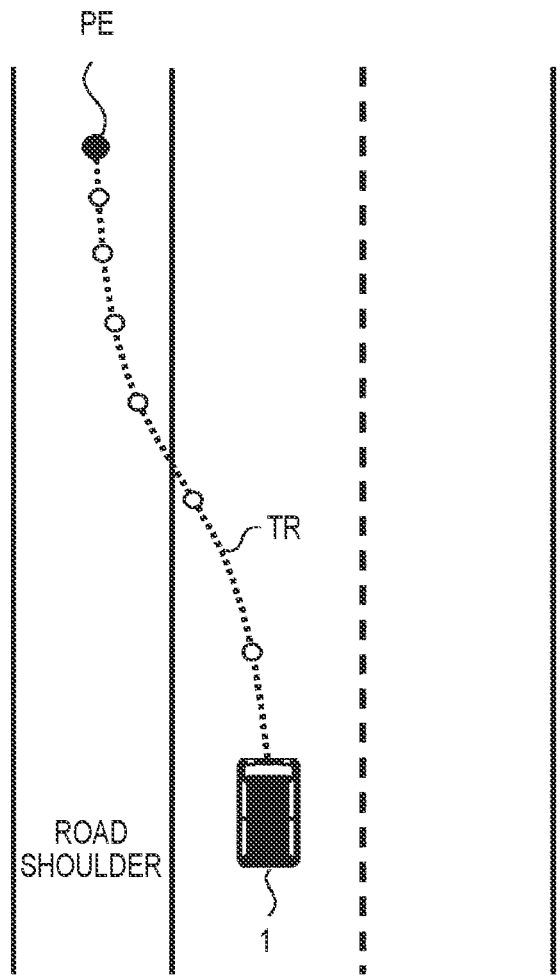
FIG. 4 is a conceptual diagram used for describing an example of retracting processing according to the embodiment of the present disclosure.

FIG. 4 is a conceptual diagram used for describing an example of the retracting processing according to the present embodiment. A "target retracting position PE" is a target stop position when causing the autonomous driving vehicle 1 to stop by the retracting processing. The target retracting position PE may be set at a safe position on a road. In the example illustrated in FIG. 4, the target retracting position PE is set on a road shoulder. The autonomous driving system 10 controls the autonomous driving vehicle 1 such that the autonomous driving vehicle 1 travels toward the target retracting position PE and stops at the target retracting position PE. For example, the autonomous driving system 10 generates a target trajectory TR through which the autonomous driving vehicle 1 travels from a current position toward the target retracting position PE and stops at the target retracting position PE. Then, the autonomous driving system 10 controls the traveling of the autonomous driving vehicle 1 such that the autonomous driving vehicle 1 follows the target trajectory TR.

An area that can be used as the target retracting position PE in the retracting processing may be determined in advance. The area that can be used as the target retracting position PE in the retracting processing is hereinafter referred to as a "stop candidate area AC".

Figure 5:
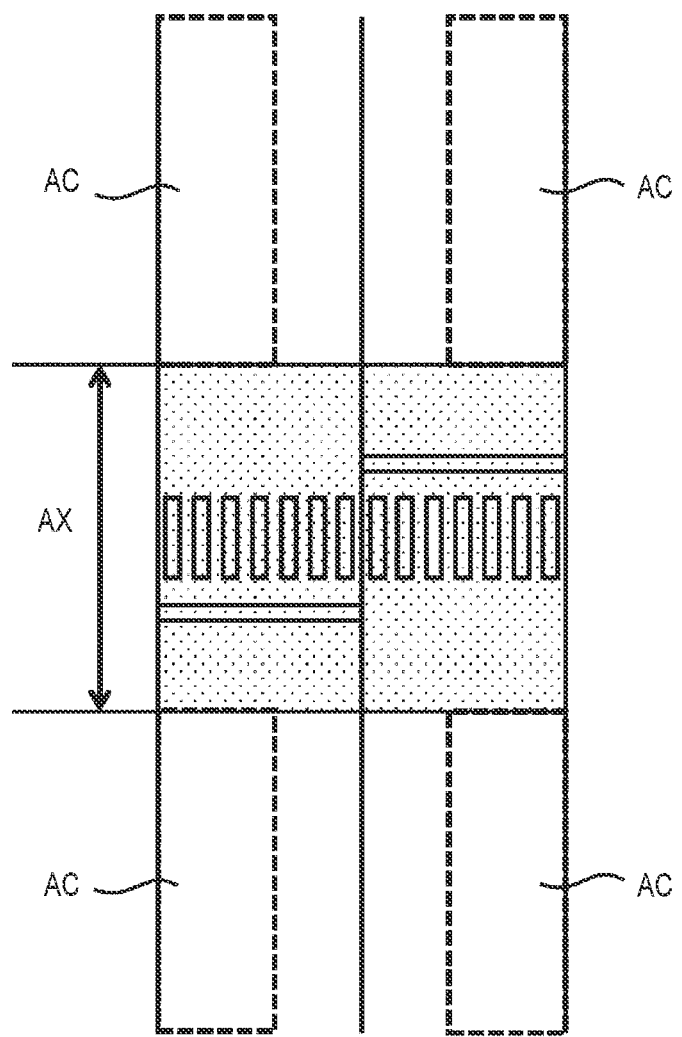
FIG. 5 is a conceptual diagram used for describing an example of vehicle stop candidate areas according to the embodiment of the present disclosure.

FIG. 5 is a conceptual diagram used for describing an example of the stop candidate area AC. In order to describe the stop candidate area AC, first, a "stop prohibited area AX" will be described. The stop prohibited area AX is an area in which parking and stopping of a vehicle are prohibited, and is determined in advance by the Road Traffic Act and the like. In the example illustrated in FIG. 5, the stop prohibited area AX includes a crosswalk and an area having a predetermined width on the surroundings of the crosswalk. The stop prohibited area AX may include an intersection and an area having a predetermined width on the surroundings of the intersection. In addition, the stop prohibited area AX also includes an area before firefighting equipment and the like.

The stop candidate area AC is selected from among areas other than the stop prohibited area AX on the road. Typically, the stop candidate area AC is a part of an area other than the stop prohibited area AX. For example, the stop candidate area AC is selected from the viewpoint of ensuring the safety of the stopped autonomous driving vehicle 1. As illustrated in FIG. 5, the stop candidate area AC may be an area relatively close to a road edge. The stop candidate area AC may be set to include a road shoulder or a roadside zone.

Figure 6:
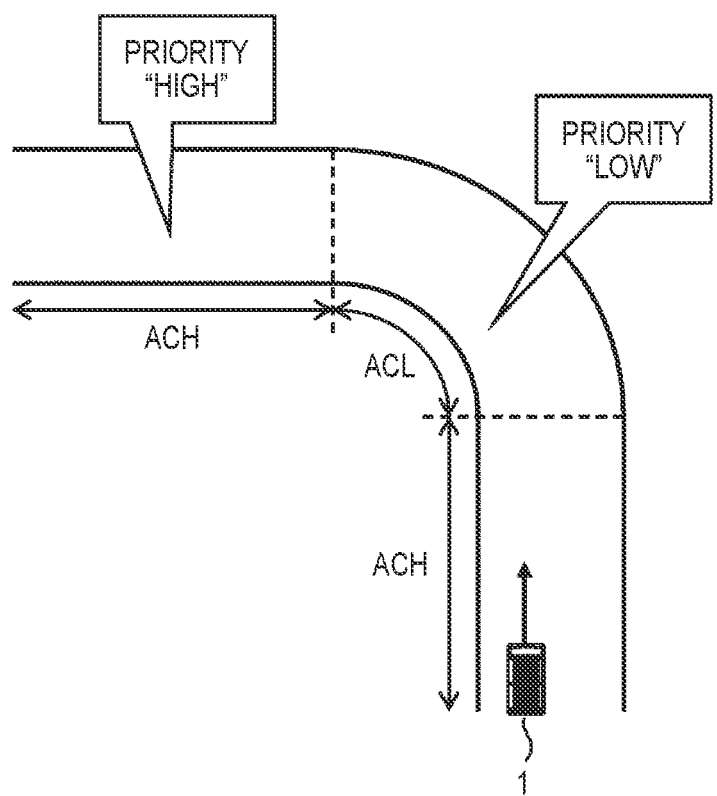
FIG. 6 is a conceptual diagram used for describing an example of a high priority area and a low priority area according to the embodiment of the present disclosure.

As illustrated in FIG. 6, a priority may be set in the stop candidate area AC. A high priority area ACH is a stop candidate area AC having a relatively high priority, and a low priority area ACL is a stop candidate area AC having a relatively low priority. In the example illustrated in FIG. 6, straight sections are set as the high priority areas ACHs and a curved section is set as the low priority area ACL.

The stop candidate area AC and the stop prohibited area AX are registered in advance in, for example, map information. In the retracting processing, the autonomous driving system 10 may set the target retracting position PE such that the target retracting position PE is included in the stop candidate area AC. When the priority is set in the stop candidate area AC, the autonomous driving system 10 sets the target retracting position PE such that the target retracting position PE is included in the stop candidate area AC having a priority as high as possible.

2-3. Retracting Margin Section

As described above, when an abnormality is detected in the remote assistance system 4, the autonomous driving system 10 executes the retracting processing. However, it is not always required to cause the autonomous driving vehicle 1 to make an emergency stop immediately after an abnormality is detected in the remote assistance system 4. This is because, in a situation where the remote assistance is not required, the autonomous driving system 10 can continue the autonomous driving as usual. In other words, it is not required to cause the autonomous driving vehicle 1 to rush to change lanes or suddenly decelerate even when an abnormality is detected in the remote assistance system 4. With the present embodiment, the autonomous driving system 10 sets the target retracting position PE also in consideration of a possibility that the remote assistance may be required.

The position at which the remote assistance for the autonomous driving vehicle 1 may be required is hereinafter referred to as a "specific position PS". For example, the specific position PS is an intersection, as illustrated in FIG. 3. As another example, the specific position PS may be a position other than an operational design domain (ODD), which is an area in which the autonomous driving is possible. As yet another example, the specific position PS may include a construction section, a traffic congestion section, an accident occurrence position, and the like. Typically, the specific position PS is registered in advance in the map information. Alternatively, information on the specific position PS, such as a traffic congestion section or an accident occurrence position, may be acquired in real time.

Figure 7:
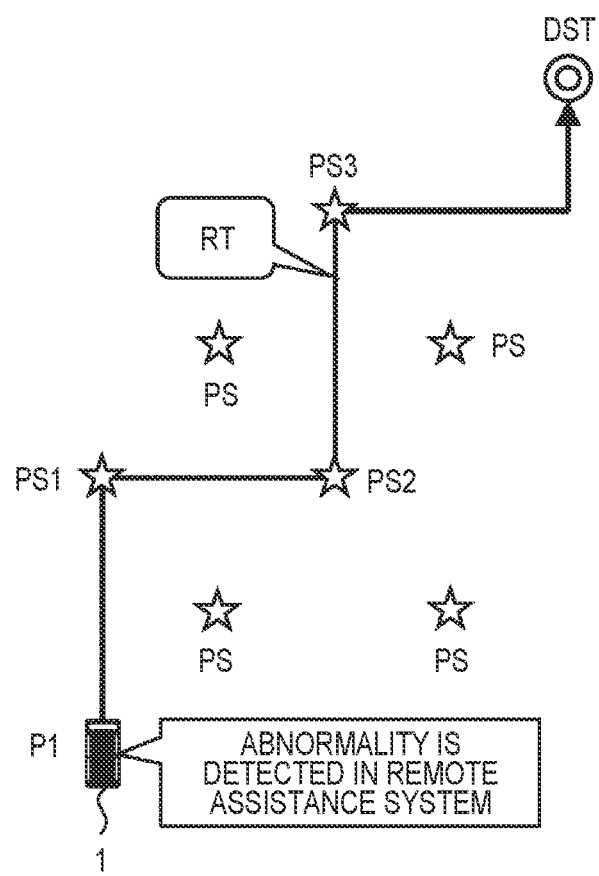
FIG. 7 is a conceptual diagram used for describing processing at a time of an occurrence of an abnormality in the remote assistance system according to the embodiment of the present disclosure.

FIG. 7 illustrates an example of a situation of the autonomous driving at the timing when the abnormality is detected in the remote assistance system 4. The current position and a destination of the autonomous driving vehicle 1 are represented by reference signs "P1" and "DST", respectively. A target route RT from the current position P1 to the destination DST of the autonomous driving vehicle 1 is set by the autonomous driving system 10. The autonomous driving system 10 controls the autonomous driving vehicle 1 such that it heads toward the destination DST along the target route RT.

At a time point at which the abnormality is detected in the remote assistance system 4, specific positions PS exist on the target route RT to the destination DST. In the example illustrated in FIG. 7, a plurality of specific positions PS1, PS2, PS3 exists on the target route RT. The autonomous driving system 10 sets any specific position PS on the target route RT as a "limit position PL" (see FIG. 8). A section of the target route RT from the current position P1 to the limit position PL is hereinafter referred to as a "retracting margin section XE" (see FIG. 8). The autonomous driving system 10 selects the target retracting position PE from the retracting margin section XE. In other words, the autonomous driving system 10 selects the target retracting position PE such that the target retracting position PE is included in the retracting margin section XE.

Figure 8:
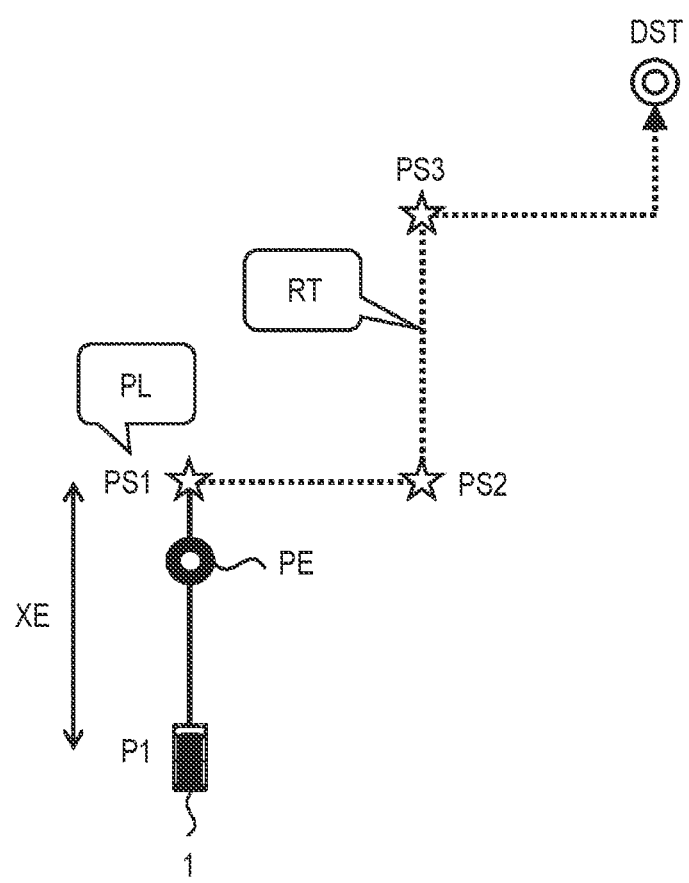
FIG. 8 is a conceptual diagram used for describing an example of the processing at the time of the occurrence of the abnormality in the remote assistance system according to the embodiment of the present disclosure.

FIG. 8 is a conceptual diagram used for describing an example of the limit position PL and the retracting margin section XE. In the example illustrated in FIG. 8, the limit position PL is a first specific position PS1 closest to the current position P1 on the target route RT. The retracting margin section XE is a section from the current position P1 to the first specific position PS1. The target retracting position PE is selected from the retracting margin section XE. The target retracting position PE does not have to be around the current position P1 and may be before the first specific position PS1 (the limit position PL). Therefore, the target retracting position PE can be set such that the autonomous driving vehicle 1 can stop with a margin. In other words, it is possible to execute the retracting processing with a margin. Consequently, the safety of the autonomous driving vehicle 1 and vehicles in its vicinity can be improved.

Further, in the example illustrated in FIG. 8, the autonomous driving vehicle 1 stops at the target retracting position PE without passing through any specific position PS. Therefore, no situation where the remote assistance is required occurs. As such, it is possible to preemptively avoid a situation where the remote assistance is required but the remote assistance cannot be received.

Figure 9:
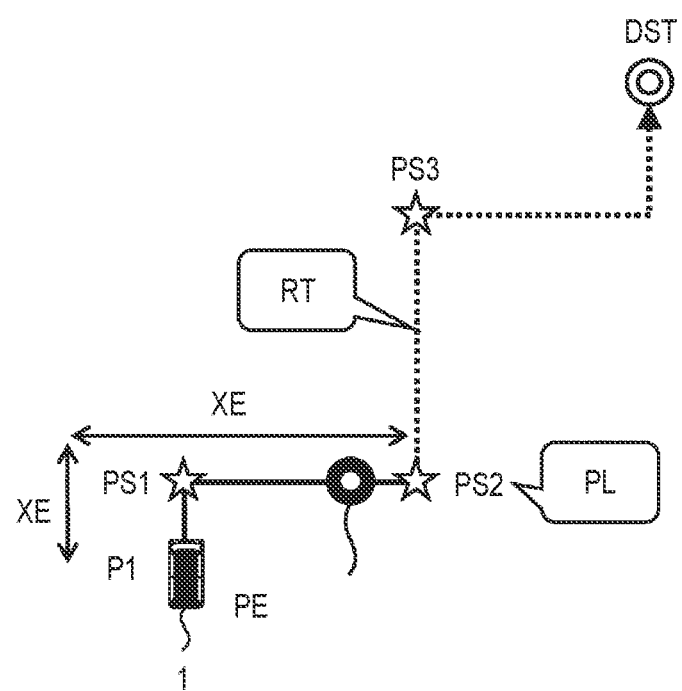
FIG. 9 is a conceptual diagram used for describing another example of the processing at the time of the occurrence of the abnormality in the remote assistance system according to the embodiment of the present disclosure.

FIG. 9 is a conceptual diagram used for describing another example of the limit position PL and the retracting margin section XE. The limit position PL is not limited to only the first specific position PS1 closest to the current position P1. For example, when the current position P1 is immediately before the first specific position PS1, a second specific position PS2 after the first specific position PS1 may be set as the limit position PL. The retracting margin section XE is a section from the current position P1 to the second specific position PS2. The target retracting position PE is selected from the retracting margin section XE. As such, it is not required to cause the autonomous driving vehicle 1 to rush to change lanes or suddenly decelerate in order to stop before the first specific position PS1. In other words, it is possible to execute the retracting processing with a margin.

In the example illustrated in FIG. 9, the autonomous driving vehicle 1 is required to pass through the first specific position PS1. The first specific position PS1 is a position at which the remote assistance may be required, but the remote assistance is not always required at the first specific position PS1. When the remote assistance is not required at the first specific position PS1, the autonomous driving vehicle 1 can pass through the first specific position PS1 by normal autonomous driving. Even when the remote assistance is required at the first specific position PS1, in a case where the abnormality in the remote assistance system 4 is "performance degradation", the remote assistance is possible, albeit slow. In this case as well, the autonomous driving vehicle 1 can pass through the first specific position PS1. Thereafter, the autonomous driving vehicle 1 stops at the target retracting position PE before passing through the second specific position PS2. As compared with a case where the autonomous driving vehicle 1 has to travel to the destination DST, the number of specific positions PS which the autonomous driving vehicle 1 passes through is reduced. Since the number of specific positions PS which the autonomous driving vehicle 1 passes through is reduced, a probability that the remote assistance is required is reduced as a whole. Therefore, an influence of the abnormality in the remote assistance system 4 is at least reduced.

2-4. Advantageous Effect

As described above, with the present embodiment, when an abnormality is detected in the remote assistance system 4, the target retracting position PE is set in consideration of the specific position PS at which the remote assistance can be required. Specifically, any specific position PS on the target route RT to the destination DST is set as the limit position PL. Then, the target retracting position PE is set such that the target retracting position PE is included in the target route RT (the retracting margin section XE) from the current position P1 of the autonomous driving vehicle 1 to the limit position PL.

The target retracting position PE does not have to be around the current position P1 and may be before the limit position PL. Therefore, the target retracting position PE can be set such that the autonomous driving vehicle 1 can stop with a margin. In other words, it is possible to execute the retracting processing with a margin. Consequently, the safety of the autonomous driving vehicle 1 and vehicles in its vicinity can be improved.

Further, it is not required that the autonomous driving is ended around the current position P1, and the autonomous driving can be continued to the target retracting position PE. Consequently, the continuity of the autonomous driving can be improved.

Further, any specific position PS on the target route RT is set as the limit position PL. Thus, as compared with the case where the autonomous driving vehicle 1 has to travel to the destination DST, the number of specific positions PS which the autonomous driving vehicle 1 passes through is reduced. Since the number of specific positions PS which the autonomous driving vehicle 1 passes through is reduced, the probability that the remote assistance is required is reduced as a whole. Therefore, an influence caused by the abnormality in the remote assistance system 4 is at least reduced.

The first specific position PS1 closest to the current position P1 on the target route RT may be set as the limit position PL. In this case, the autonomous driving vehicle 1 stops at the target retracting position PE without passing through any specific position PS. Therefore, no situation where the remote assistance is required occurs. As such, it is possible to preemptively avoid a situation where the remote assistance is required but cannot be received.

Hereinafter, the autonomous driving system 10 according to the present embodiment will be described in more detail.

3. Example of Autonomous Driving System 3-1. Configuration Example

The autonomous driving system 10 controls the autonomous driving vehicle 1. Typically, the autonomous driving system 10 is mounted on the autonomous driving vehicle 1. Alternatively, at least a part of the autonomous driving system 10 may be arranged in an external device outside the autonomous driving vehicle 1 and remotely control the autonomous driving vehicle 1. In other words, the autonomous driving system 10 may be arranged in the autonomous driving vehicle 1 and the external device in a distributed manner.

Figure 10:
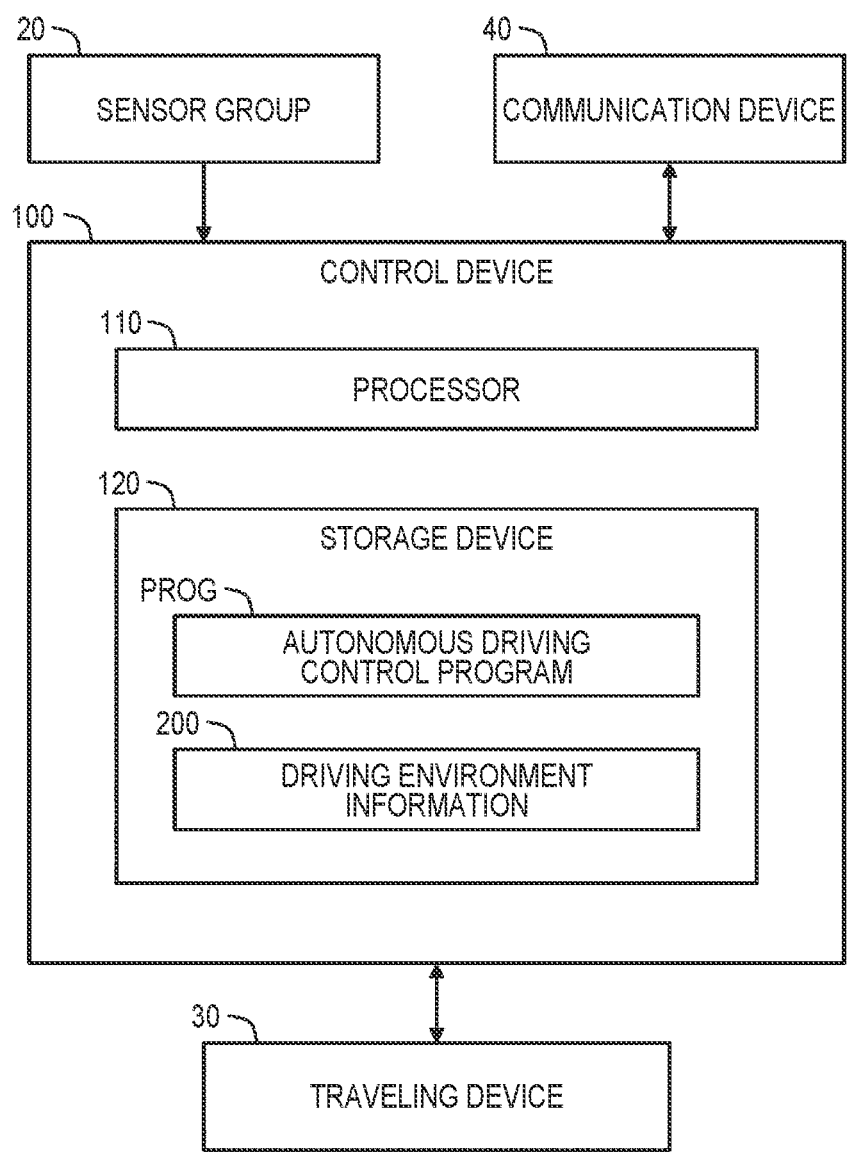
FIG. 10 is a block diagram illustrating a configuration example of an autonomous driving system according to the embodiment of the present disclosure.

FIG. 10 is a block diagram illustrating a configuration example of the autonomous driving system 10 according to the present embodiment. The autonomous driving system 10 includes a sensor group 20, a traveling device 30, a communication device 40, and a control device 100.

The sensor group 20 is mounted on the autonomous driving vehicle 1. The sensor group 20 includes a vehicle state sensor, the recognition sensor, a position sensor, and the like. The vehicle state sensor detects a state of the autonomous driving vehicle 1. Examples of the vehicle state sensor include a vehicle speed sensor, a yaw rate sensor, a lateral acceleration sensor, and a steering angle sensor. The recognition sensor detects a situation in the vicinity of the autonomous driving vehicle 1. Examples of the recognition sensor include a camera, a laser imaging detection and ranging (LIDAR), and radar. The position sensor detects the position and the azimuth of the autonomous driving vehicle 1. Examples of the position sensor include a global positioning system (GPS) sensor.

The traveling device 30 is mounted on the autonomous driving vehicle 1. The traveling device 30 includes a steering device, a drive device, and a braking device. The steering device steers wheels. For example, the steering device includes a power steering (electric power steering: EPS) device. The drive device is a power source that generates a drive force. Examples of the drive device include an engine, an electric motor, and an in-wheel motor. The braking device generates a braking force.

The communication device 40 communicates with the outside of the autonomous driving vehicle 1. For example, the communication device 40 communicates with the remote assistance device 2 via the communication network 3 (see FIGS. 1 and 2). The communication device 40 may communicate with the management server. The communication device 40 may execute V2I communication (road-to-vehicle communication) with infrastructure in the vicinity. The communication device 40 may execute V2V communication (vehicle-to-vehicle communication) with surrounding vehicles. The communication device 40 includes a communication ECU, a communication module, a transmission/reception circuit, and the like.

The control device 100 controls the autonomous driving vehicle 1. The control device 100 includes one or more processors 110 (hereinafter, simply referred to as the processor 110) and one or more storage devices 120 (hereinafter, simply referred to as the storage device 120). The processor 110 executes various processes. For example, the processor 110 includes a central processing unit (CPU). The storage device 120 stores various pieces of information. Examples of the storage device 120 include a volatile memory, a non-volatile memory, a hard disk drive (HDD), and a solid-state drive (SSD). The control device 100 may include one or more ECUs. A part of the control device 100 may be an information processing device outside the autonomous driving vehicle 1.

An autonomous driving control program PROG is a computer program for controlling the autonomous driving vehicle 1. When the processor 110 executes the autonomous operation control program PROG, various processes by the control device 100 are implemented. The autonomous operation control program PROG is stored in the storage device 120. Alternatively, the autonomous driving control program PROG may be recorded on a computer-readable recording medium.

3-2. Driving Environment Information

The driving environment information 200 indicates a driving environment of the autonomous driving vehicle 1. The driving environment information 200 is stored in the storage device 120.

Figure 11:
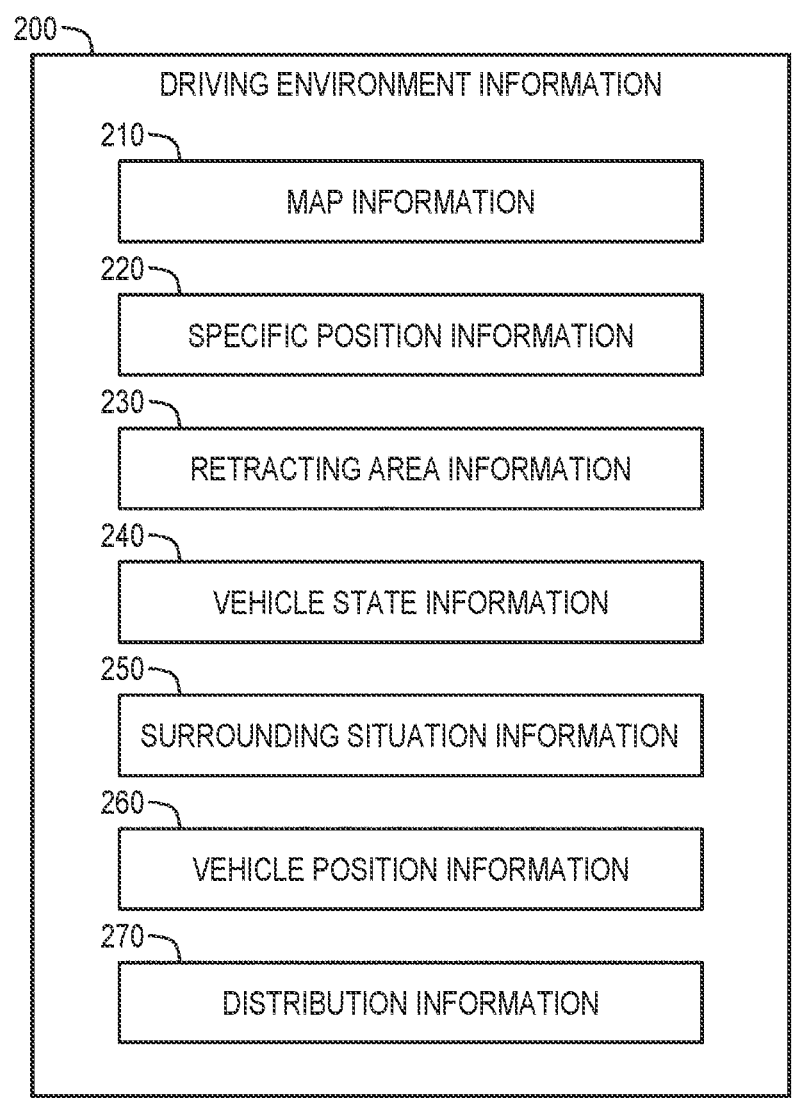
FIG. 11 is a block diagram illustrating an example of driving environment information according to the embodiment of the present disclosure.

FIG. 11 is a block diagram illustrating an example of the driving environment information 200. The driving environment information 200 includes map information 210, specific position information 220, retracting area information 230, vehicle state information 240, surrounding situation information 250, vehicle position information 260, and distribution information 270.

The map information 210 includes a general navigation map. The map information 210 may indicate a lane arrangement, a road shape, and the like. The map information 210 may include position information, such as a signal, and a sign. The processor 110 acquires the map information of a required area from the map database. The map database may be stored in a predetermined storage device mounted on the autonomous driving vehicle 1, or may be stored in an external management server. In the latter case, the processor 110 communicates with the management server and acquires required map information.

The specific position information 220 indicates a specific position PS at which the remote assistance for the autonomous driving vehicle 1 may be required. For example, the specific position information 220 is created in advance. The specific position information 220 may be included in the map information 210. As described below, the specific position information 220 may be added in real time.

The retracting area information 230 indicates the positions of the stop candidate areas AC and the stop prohibited area AX (see FIG. 5). The retracting area information 230 may indicate priorities of the stop candidate areas AC (see FIG. 6). The retracting area information 230 is created in advance. The retracting area information 230 may be included in the map information 210.

The vehicle state information 240 is information indicating the state of the autonomous driving vehicle 1. The processor 110 acquires the vehicle state information 240 from the vehicle state sensor.

The surrounding situation information 250 is information indicating the situation in the vicinity of the autonomous driving vehicle 1. The processor 110 acquires the surrounding situation information 250 using the recognition sensor. For example, the surrounding situation information 250 includes image information IMG captured by a camera. The surrounding situation information 250 further includes object information on an object in the vicinity of the autonomous driving vehicle 1. Examples of the object include a pedestrian, a bicycle, other vehicles (a preceding vehicle, a parked vehicle, and the like), a road configuration (a white line, a curb, a guardrail, a wall, a median, a roadside structure, and the like), a sign, and an obstacle. The object information indicates a relative position and relative speed of the object with respect to the autonomous driving vehicle 1.

The vehicle position information 260 is information indicating the position of the autonomous driving vehicle 1. The processor 110 acquires the vehicle position information 260 from a detection result by the position sensor. Further, the processor 110 may acquire highly accurate vehicle position information 260 using a well-known self-position estimation process (localization) in which the object information and the map information 210 are used.

The distribution information 270 includes road traffic information, construction section information, traffic regulation information, and the like. The processor 110 receives the distribution information 270 from an information provision server or roadside infrastructure via the communication device 40.

The processor 110 can grasp the construction section, the traffic congestion section, the accident occurrence position, and the like, based on the distribution information 270. In this case, the processor 110 may add a construction section, a traffic congestion section, an accident occurrence position, and the like to the specific position information 220.

3-3. Vehicle Traveling Control, Autonomous Driving Control

The processor 110 executes "vehicle traveling control" that controls the traveling of the autonomous driving vehicle 1. The vehicle traveling control includes steering control, acceleration control, and deceleration control. The processor 110 executes the vehicle traveling control by controlling the traveling device 30 (the steering device, the drive device, and the braking device). Specifically, the processor 110 executes the steering control by controlling the steering device. Further, the processor 110 executes the acceleration control by controlling the drive device. Further, the processor 110 executes the deceleration control by controlling the braking device.

Further, the processor 110 executes the autonomous driving control based on the driving environment information 200. In more detail, the processor 110 sets the target route RT to the destination DST based on the map information 210 and the like. Then, the processor 110 executes the vehicle traveling control such that the autonomous driving vehicle 1 heads toward the destination DST along the target route RT based on the driving environment information 200.

In more detail, the processor 110 generates a traveling plan of the autonomous driving vehicle 1 based on the driving environment information 200. Examples of the traveling plan include maintaining the current traveling lane, changing lanes, and avoiding an obstacle. Further, the processor 110 generates a target trajectory TR required for the autonomous driving vehicle 1 to travel according to the traveling plan. The target trajectory TR includes a target position and target speed. Then, the processor 110 executes the vehicle traveling control such that the autonomous driving vehicle 1 follows the target route RT and the target trajectory TR.

3-4. Processing Associated with Remote Assistance

During the autonomous driving, the processor 110 determines whether the remote assistance by the remote operator is required. Typically, a situation where the remote assistance by the remote operator is required is a situation where the autonomous driving is difficult. For example, when at least one of the above-described recognition processing, action determination processing, and timing determination processing is difficult, the processor 110 determines that the remote assistance by the remote operator is required.

Upon determining that the remote assistance is required, the processor 110 transmits the remote assistance request REQ to the remote assistance device 2 via the communication device 40. The remote assistance request REQ requests the remote operator to execute the remote assistance to the autonomous driving vehicle 1.

Further, the processor 110 transmits the vehicle information VCL to the remote assistance device 2 via the communication device 40. The vehicle information VCL includes at least a part of the driving environment information 200. For example, the vehicle information VCL includes the image information IMG captured by a camera. The vehicle information VCL may include the object information. The vehicle information VCL may include the vehicle state information 240 or the vehicle position information 260. The vehicle information VCL may include results of the recognition processing, the action determination processing, and the timing determination processing.

Further, the processor 110 receives an operator instruction INS from the remote assistance device 2 via the communication device 40. The operator instruction INS is an instruction to the autonomous driving vehicle 1 input by the remote operator. Upon receiving the operator instruction INS, the processor 110 executes the vehicle traveling control according to the received operator instruction INS.

Figure 12:
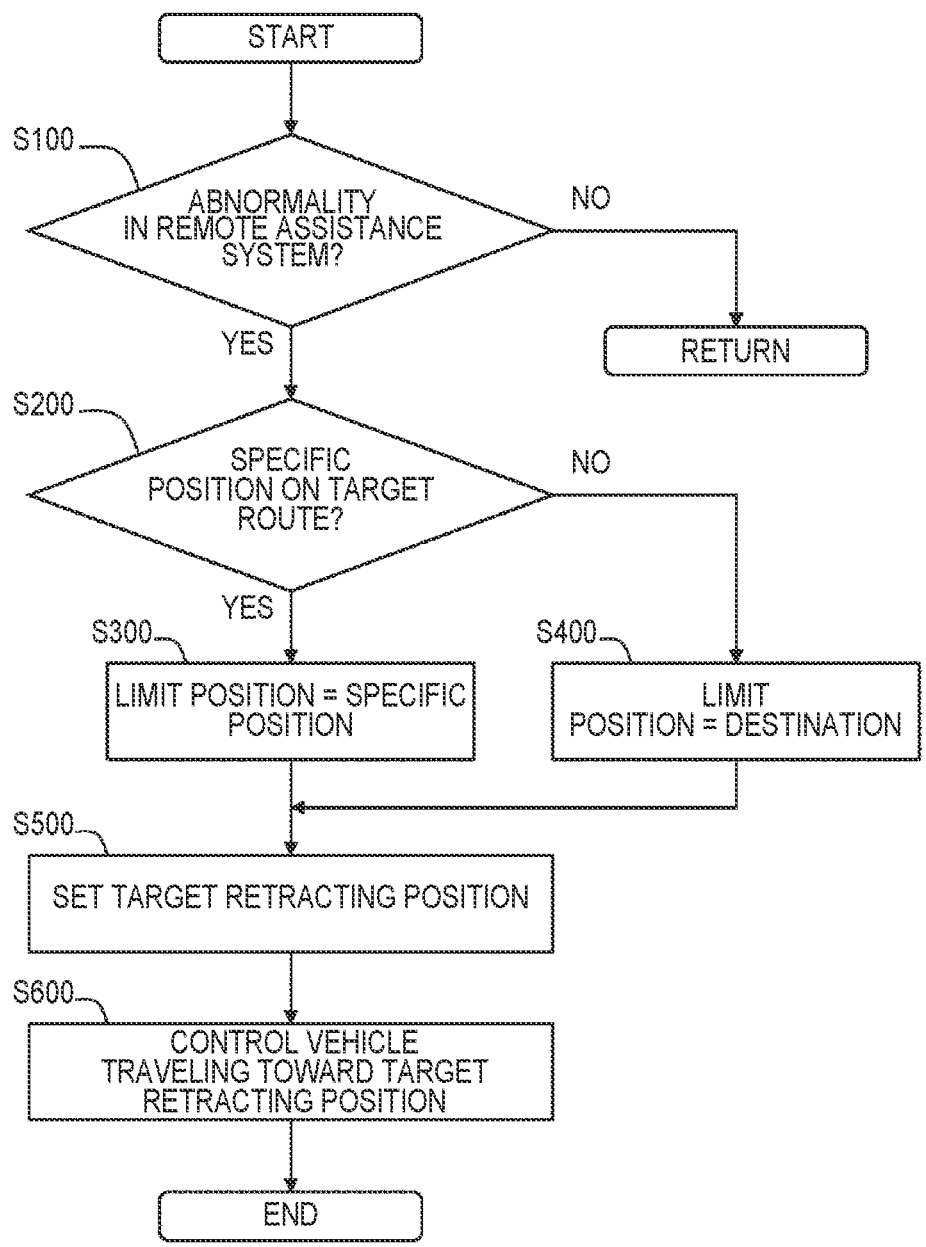
FIG. 12 is a flowchart illustrating a processing example by the autonomous driving system according to the embodiment of the present disclosure.

4. Processing Flow at Time of Occurrence of Abnormality in Remote Assistance System FIG. 12 is a flowchart illustrating a processing example by the autonomous driving system 10 according to the present embodiment. In particular, FIG. 12 illustrates a processing flow associated with a time of an occurrence of an abnormality in the remote assistance system 4.

4-1. Step S100

In step S100, the processor 110 determines the presence/absence of an abnormality in the remote assistance system 4 that provides the remote assistance to the autonomous driving vehicle 1. For example, the remote assistance system 4 includes the remote assistance device 2, the communication network 3, and a communication device 40 of the autonomous driving system 10.

Abnormalities in the remote assistance system 4 include a "functional failure" in which a function of the remote assistance system 4 is lost. For example, the processor 110 monitors a communication situation (for example, a throughput or the communication speed) with the remote assistance device 2. When the communication with the remote assistance device 2 is disrupted, the processor 110 determines that the functional failure has occurred in the remote assistance device 2 or the communication network 3. As another example, the communication device 40 (for example, the communication ECU) of the autonomous driving system 10 has a self-diagnosis function. Using the self-diagnosis function, the processor 110 can detect a functional failure of the communication device 40.

Abnormalities in the remote assistance system 4 may include "performance degradation" in which the function of the remote assistance system 4 is degraded. For example, the processor 110 monitors the communication situation (for example, a throughput, the communication speed, or the communication delay) with the remote assistance device 2. When the throughput or the communication speed is lower than a first threshold value, the processor 110 determines that performance degradation has occurred in the remote assistance system 4. As another example, when the communication delay exceeds a second threshold value, the processor 110 determines that performance degradation has occurred in the remote assistance system 4.

When no abnormality is detected in the remote assistance system 4 (step S100: No), the process ends in this cycle. On the other hand, when an abnormality is detected in the remote assistance system 4 (step S100: Yes), the process proceeds to step S200.

4-2. Step S200

In step S200, the processor 110 determines whether the specific position PS exists on the target route RT from the current position P1 to the destination DST. The target route RT is set and grasped by the processor 110. The specific position PS is obtained from the specific position information 220. Therefore, the processor 110 can determine whether the specific position PS exists on the target route RT based on the specific position information 220.

When the specific position PS exists on the target route RT (step S200: Yes), the process proceeds to step S300. On the other hand, when no specific position PS exists on the target route RT (step S200: No), the process proceeds to step S400.

4-3. Step S300

In step S300, the processor 110 sets any specific position PS on the target route RT as the limit position PL based on the target route RT and the specific position information 220. Thereafter, the process proceeds to step S500. Hereinafter, some examples of step S300 will be described.

4-3-1. Example 1

Figure 13:
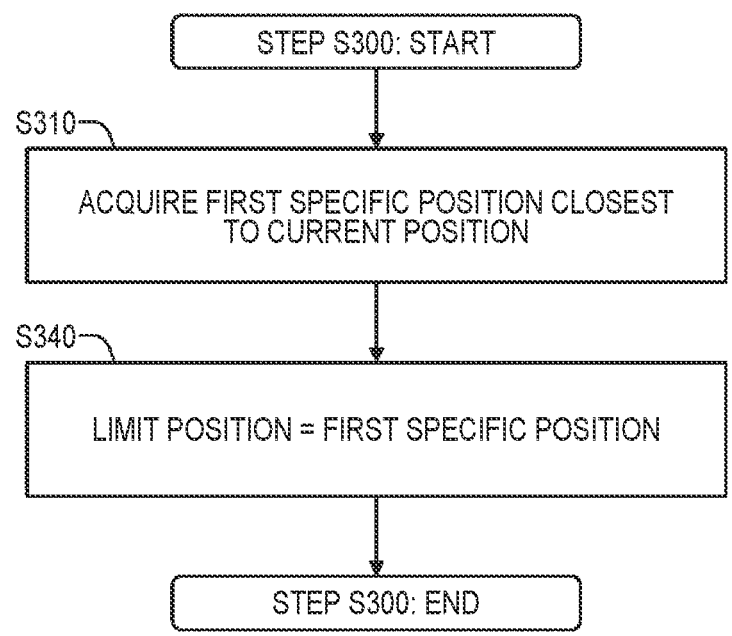
FIG. 13 is a flowchart illustrating an example 1 of step S300 according to the embodiment of the present disclosure.

FIG. 13 is a flowchart illustrating an example 1 of step S300.

In step S310, the processor 110 acquires the first specific position PS1 closest to the current position P1 on the target route RT. The current position P1 is obtained from the vehicle position information 260. The specific position PS is obtained from the specific position information 220. The processor 110 can acquire the first specific position PS1 based on the specific position information 220 and the vehicle position information 260.

In step S340, the processor 110 sets the first specific position PS1 as the limit position PL.

With the example 1, it is possible to stop the autonomous driving vehicle 1 without causing it to pass through any specific position PS.

4-3-2. Example 2

Figure 14:
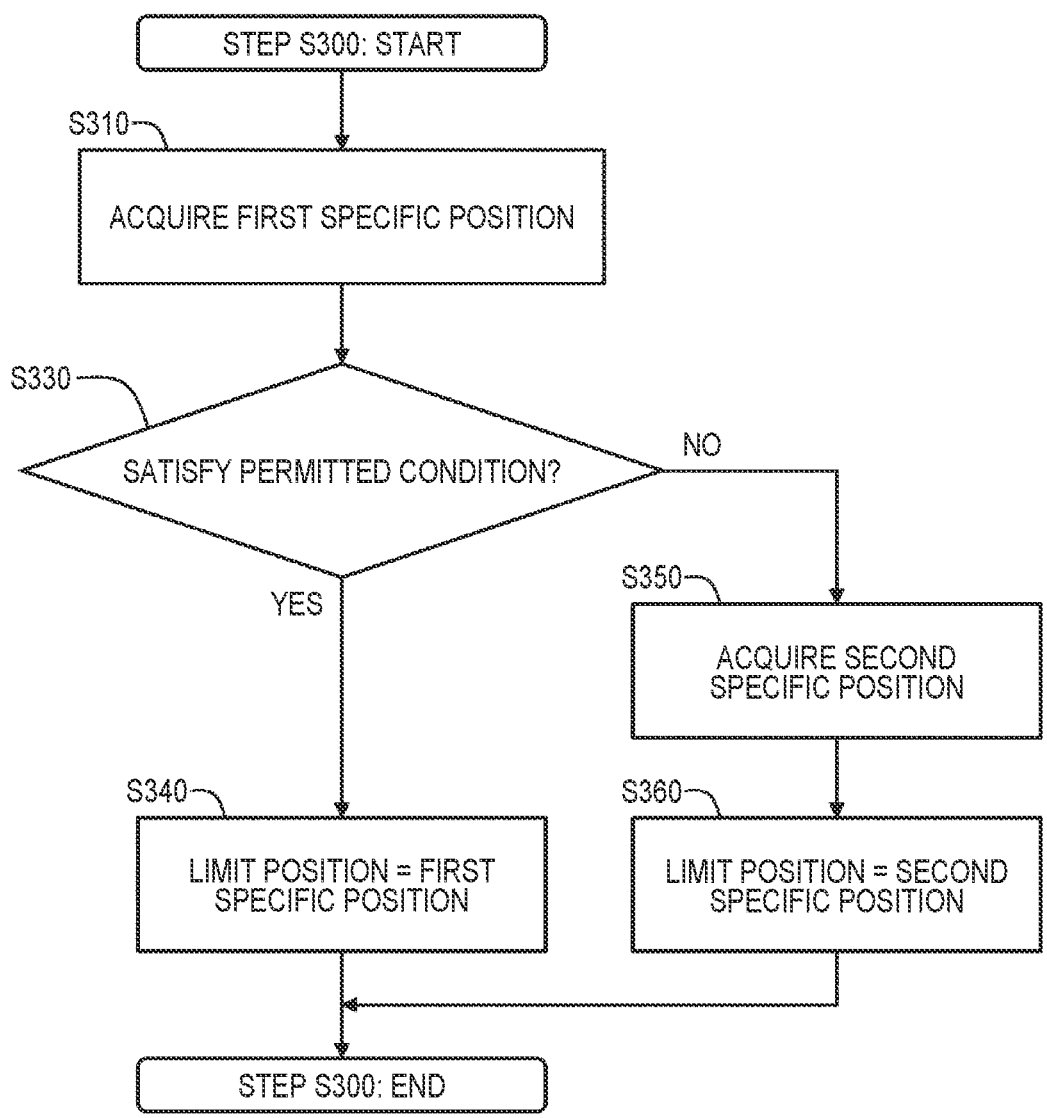
FIG. 14 is a flowchart illustrating an example 2 of step S300 according to the embodiment of the present disclosure.

FIG. 14 is a flowchart illustrating an example 2 of step S300. Step S310 is the same as that in the case of the example 1.

In step S330, the processor 110 determines whether the first specific position PS1 satisfies a permitted condition. The permitted condition is set from the viewpoint of whether it is possible to stop the autonomous driving vehicle 1 without causing it to rush to change lanes or suddenly decelerate.

For example, the permitted condition includes at least one of the following conditions (A) and (B):

Condition (A): A distance between the current position P1 and the first specific position PS1 is equal to or greater than a predetermined distance threshold value.

Condition (B): A vehicle control amount that is required to stop the autonomous driving vehicle 1 at a position before the first specific position PS1 is equal to or lower than a control amount threshold value. Here, examples of the vehicle control amount include deceleration and a steering amount.

The current position P1 of the autonomous driving vehicle 1 is obtained from the vehicle position information 260. The current speed of the autonomous driving vehicle 1 is obtained from the vehicle state information 240. Kinetic performance of the autonomous driving vehicle 1 is given in advance as information. The processor 110 determines whether the first specific position PS1 satisfies the permitted condition based on the current position P1, the first specific position PS1, the current vehicle speed, the kinetic performance, and the like.

When the first specific position PS1 satisfies the permitted condition (step S330: Yes), the process proceeds to step S340. In step S340, the processor 110 sets the first specific position PS1 as the limit position PL.

On the other hand, when the first specific position PS1 does not satisfy the permitted condition (step S330: No), the process proceeds to step S350. In step S350, the processor 110 acquires a second specific position PS2 different from the first specific position PS1 on the target route RT based on the specific position information 220. For example, the second specific position PS2 is a specific position PS after the first specific position PS1 when viewed from the current position P1 (see FIG. 9). Thereafter, the process proceeds to step S360.

In step S360, the processor 110 sets the second specific position PS2 as the limit position PL.

With the example 2, it is possible to stop the autonomous driving vehicle 1 without causing it to rush to change lanes or suddenly decelerate.

4-3-3. Example 3

Figure 15:
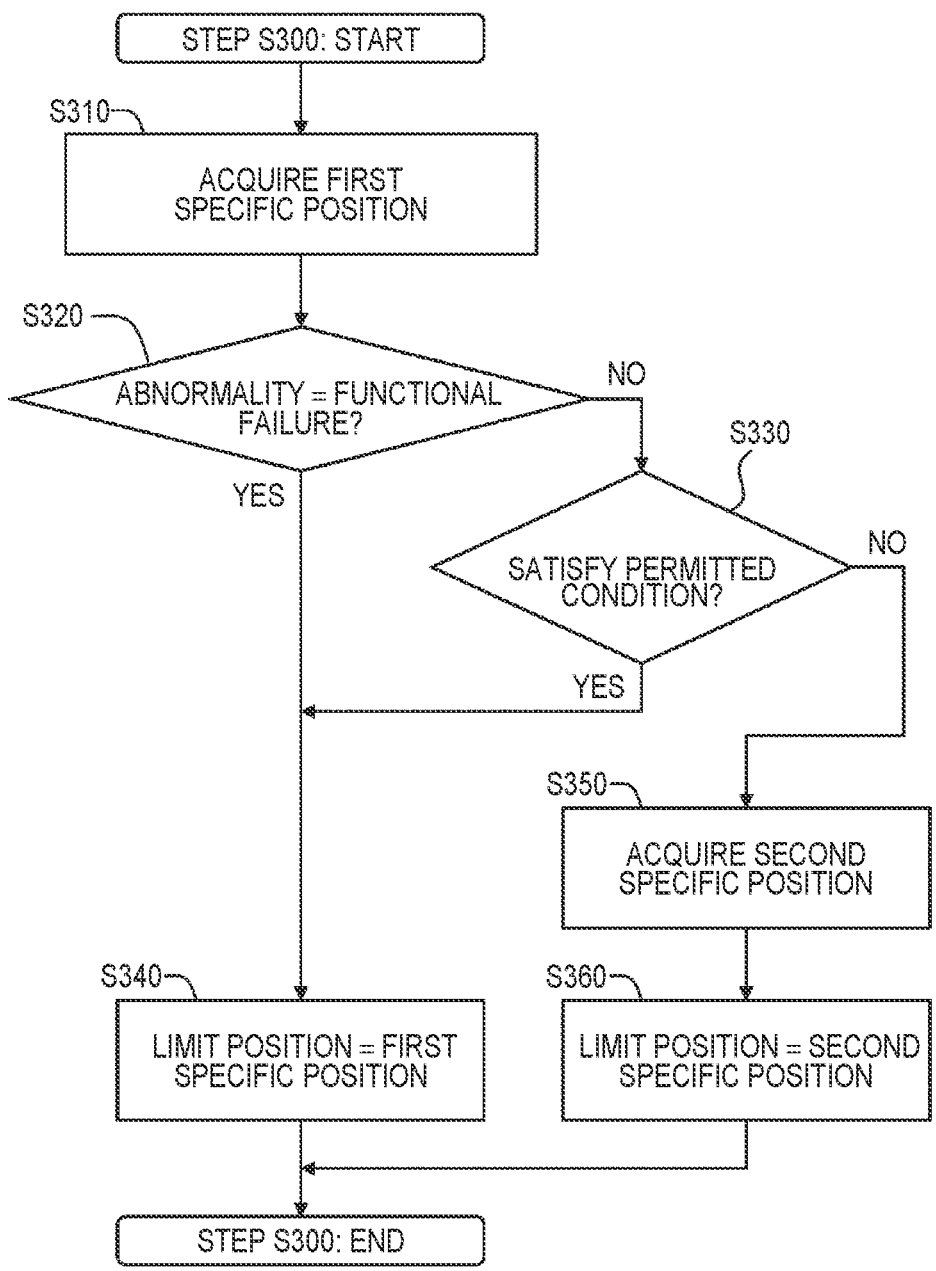
FIG. 15 is a flowchart illustrating an example 3 of step S300 according to the embodiment of the present disclosure.

FIG. 15 is a flowchart illustrating an example 3 of step S300. Step S310 is the same as that in the case of the example 1.

In step S320, the processor 110 determines whether the abnormality in the remote assistance system 4 is a functional failure or performance degradation.

When the abnormality detected in the remote assistance system 4 is a functional failure (step S320: Yes), the process proceeds to step S340. In step S340, the processor 110 sets the first specific position PS1 as the limit position PL.

On the other hand, when the abnormality in the remote assistance system 4 is performance degradation (step S320: No), the process proceeds to step S330. Step S330 and steps thereafter are the same as those in the case of the example 2.

With the example 3, when the abnormality in the remote assistance system 4 is performance degradation, it is possible to expand a selection range of the target retracting position PE. In other words, when the abnormality in the remote assistance system 4 is performance degradation, it is possible to alleviate a condition imposed on the target retracting position PE.

4-4. Step S400

In step S400, the processor 110 sets the destination DST as the limit position PL. Thereafter, the process proceeds to step S500.

4-5. Step S500

In step S500, the processor 110 sets the target retracting position PE based on the limit position PL. Specifically, the processor 110 acquires a section of the target route RT from the current position P1 to the limit position PL as the retracting margin section XE. Then, the processor 110 selects the target retracting position PE from the retracting margin section XE. In other words, the processor 110 sets the target retracting position PE such that the target retracting position PE is included in the retracting margin section XE.

The processor 110 sets the target retracting position PE such that the autonomous driving vehicle 1 can actually stop based on the current position P1, the vehicle speed, the kinetic performance, and the like of the autonomous driving vehicle 1.

When setting the target retracting position PE, the processor 110 may further refer to the retracting area information 230. The retracting area information 230 indicates the positions of the stop candidate areas AC and the stop prohibited area AX. The processor 110 sets the target retracting position PE in the stop candidate area AC that is included in the retracting margin section XE except for the stop prohibited area AX. The retracting area information 230 may indicate the priorities of the stop candidate areas AC. In that case, the processor 110 sets the target retracting position PE such that the target retracting position PE is included in the stop candidate area AC having a priority as high as possible.

4-6. Step S600

In step S600, the processor 110 executes the vehicle traveling control such that the autonomous driving vehicle 1 travels toward the target retracting position PE and stops at the target retracting position PE. For example, the processor 110 generates a target trajectory TR through which the autonomous driving vehicle 1 travels from the current position P1 toward the target retracting position PE and stops at the target retracting position PE. Then, the autonomous driving system 10 executes the vehicle traveling control such that the autonomous driving vehicle 1 follows the target trajectory TR (see FIG. 4).

What is claimed is:

1. An autonomous driving system configured to control an autonomous driving vehicle that is a target of remote assistance, the autonomous driving system comprising:
    one or more storage devices configured to store specific position information indicating specific positions at which there is a possibility that the remote assistance is required; and
    one or more processors configured to:
    determine presence or absence of an abnormality in a remote assistance system configured to provide the remote assistance to the autonomous driving vehicle;
    set, when the abnormality is detected in the remote assistance system, any one of the specific positions on a target route from a current position of the autonomous driving vehicle to a destination as a limit position based on the specific position information;
    set a target retracting position such that the target retracting position is included in the target route from the current position to the limit position; and
    control the autonomous driving vehicle such that the autonomous driving vehicle stops at the target retracting position, wherein the one or more processors are further configured to:
    acquire a first specific position closest to the current position on the target route based on the specific position information;
    determine, when the abnormality in the remote assistance system is performance degradation, whether the first specific position satisfies a permitted condition, the permitted condition including a vehicle control amount that is required to stop the autonomous driving vehicle at a position before the first specific position, is equal to or lower than a control amount threshold value, the vehicle control amount including deceleration and a steering amount;
    acquire, when the first specific position does not satisfy the permitted condition, a second specific position different from the first specific position on the target route based on the specific position information;
    set, when the first specific position does not satisfy the permitted condition, the second specific position as the limit position; and
    set, when the abnormality in the remote assistance system is a functional failure, the first specific position as the limit position.

2. An autonomous driving control method, executed by one or more processors and controlling an autonomous driving vehicle that is a target of remote assistance, the autonomous driving control method comprising:
    determining presence or absence of an abnormality in a remote assistance system configured to provide the remote assistance to the autonomous driving vehicle;
    setting, when the abnormality is detected in the remote assistance system, any one of specific positions on a target route from a current position of the autonomous driving vehicle to a destination as a limit position based on specific position information, the specific position information indicating the specific positions at which there is a possibility that the remote assistance is required;
    setting a target retracting position such that the target retracting position is included in the target route from the current position to the limit position; and
    controlling the autonomous driving vehicle such that the autonomous driving vehicle stops at the target retracting position, the autonomous driving control method further comprising:
    acquiring a first specific position closest to the current position on the target route based on the specific position information;
    determining, when the abnormality in the remote assistance system is performance degradation, whether the first specific position satisfies a permitted condition, the permitted condition including a vehicle control amount that is required to stop the autonomous driving vehicle at a position before the first specific position, is equal to or lower than a control amount threshold value, the vehicle control amount including deceleration and a steering amount;
    acquiring, when the first specific position does not satisfy the permitted condition, a second specific position different from the first specific position on the target route based on the specific position information;
    setting, when the first specific position does not satisfy the permitted condition, the second specific position as the limit position; and
    setting, when the abnormality in the remote assistance system is a functional failure, the first specific position as the limit position.

3. A non-transitory storage medium storing instructions that are executable by a computer and that causes the computer to perform functions for controlling an autonomous driving vehicle that is a target of remote assistance, the functions comprising:
    determining presence or absence of an abnormality in a remote assistance system configured to provide the remote assistance to the autonomous driving vehicle;
    setting, when the abnormality is detected in the remote assistance system, any one of specific positions on a target route from a current position of the autonomous driving vehicle to a destination as a limit position based on specific position information, the specific position information indicating the specific positions at which there is a possibility that the remote assistance is required;
    setting a target retracting position such that the target retracting position is included in the target route from the current position to the limit position; and
    controlling the autonomous driving vehicle such that the autonomous driving vehicle stops at the target retracting position, the functions further comprising:
    acquiring a first specific position closest to the current position on the target route based on the specific position information;
    determining, when the abnormality in the remote assistance system is performance degradation, whether the first specific position satisfies a permitted condition, the permitted condition including a vehicle control amount that is required to stop the autonomous driving vehicle at a position before the first specific position, is equal to or lower than a control amount threshold value, the vehicle control amount including deceleration and a steering amount;

acquiring, when the first specific position does not satisfy the permitted condition, a second specific position different from the first specific position on the target route based on the specific position information;

setting, when the first specific position does not satisfy the permitted condition, the second specific position as the limit position; and setting, when the abnormality in the remote assistance system is a functional failure, the first specific position as the limit position.

* * * * *